(12) United States Patent
Takemoto et al.

(10) Patent No.: US 10,619,606 B2
(45) Date of Patent: Apr. 14, 2020

(54) INTERNAL COMBUSTION ENGINE

(71) Applicant: MITSUBISHI HEAVY INDUSTRIES ENGINE & TURBOCHARGER, LTD., Sagamihara-shi, Kanagawa (JP)

(72) Inventors: Daisuke Takemoto, Tokyo (JP); Akihiro Yuuki, Tokyo (JP); Tatsuo Ishiguro, Tokyo (JP); Kazuo Ogura, Tokyo (JP); Yuta Furukawa, Tokyo (JP); Shinnosuke Osafune, Tokyo (JP)

(73) Assignee: MITSUBISHI HEAVY INDUSTRIES ENGINE & TURBOCHARGER, LTD., Sagamihara-Shi, Kanagawa (JP)

( * ) Notice: Subject to any disclaimer, the term of this patent is extended or adjusted under 35 U.S.C. 154(b) by 0 days.

(21) Appl. No.: 16/077,331

(22) PCT Filed: Jan. 11, 2017

(86) PCT No.: PCT/JP2017/000566
§ 371 (c)(1),
(2) Date: Aug. 10, 2018

(87) PCT Pub. No.: WO2017/141576
PCT Pub. Date: Aug. 24, 2017

(65) Prior Publication Data
US 2019/0055908 A1 Feb. 21, 2019

(30) Foreign Application Priority Data
Feb. 15, 2016 (JP) .................... 2016-025755

(51) Int. Cl.
*F02M 35/10* (2006.01)
*F02M 35/104* (2006.01)
(Continued)

(52) U.S. Cl.
CPC ....... *F02M 35/10295* (2013.01); *F02B 27/00* (2013.01); *F02B 27/02* (2013.01);
(Continued)

(58) Field of Classification Search
CPC F02M 35/10295; F02M 35/104; F02B 27/00; F02B 27/02; F02B 75/16;
(Continued)

(56) References Cited

U.S. PATENT DOCUMENTS 4,574,748 A * 3/1986 Inoue ...................... F02B 27/02
                                                      123/184.53
4,608,948 A * 9/1986 Inoue ............... F02M 35/10229
                                                      123/184.53
(Continued)

FOREIGN PATENT DOCUMENTS

JP 57-68123 U 4/1982
JP 59-2919 U 1/1984
(Continued)

OTHER PUBLICATIONS

Office Action dated Aug. 6, 2019 issued in the corresponding JP Application No. 2016-025755.
(Continued)

*Primary Examiner* — Hung Q Nguyen
(74) *Attorney, Agent, or Firm* — Birch, Stewart, Kolasch & Birch, LLP (57) ABSTRACT

An internal combustion engine includes: an engine body (10) having at least one cylinder; and an air-supply manifold (4) including an adjustment pipe (12). The length of the adjustment pipe is set so that a first pressure wave (14A) propagating from the air-supply manifold toward the adjustment pipe and a second pressure wave (14B) propagating from the adjustment pipe toward the air-supply manifold have opposite phases from each other at the cylinder.

9 Claims, 6 Drawing Sheets (51) Int. Cl.
*F02B 27/02* (2006.01)
*F02B 27/00* (2006.01)
*F02B 75/16* (2006.01)
*F02D 41/00* (2006.01)

(52) U.S. Cl.
CPC .......... *F02B 75/16* (2013.01); *F02D 41/0002* (2013.01); *F02M 35/104* (2013.01); *F02D 2200/0414* (2013.01); *F02D 2200/101* (2013.01); *Y02T 10/146* (2013.01)

(58) Field of Classification Search
CPC .......... F02D 41/0002; F02D 2200/101; F02D 2200/0414; Y02T 10/146
See application file for complete search history.

(56) References Cited

U.S. PATENT DOCUMENTS

| | | | | |
|---|---|---|---|---|
| 5,040,495 | A | * | 8/1991 | Harada ............... F02B 27/008 123/184.57 |
| 5,107,800 | A | * | 4/1992 | Araki .................. F02D 9/1055 123/184.57 |
| 5,379,735 | A | * | 1/1995 | Ma ...................... F02B 27/00 123/184.42 |
| 5,441,023 | A | * | 8/1995 | Ma ...................... F01N 1/02 123/184.57 |
| 6,006,712 | A | * | 12/1999 | Suzuki ............. F02M 35/10019 123/184.53 |
| 6,155,225 | A | * | 12/2000 | Suzuki ............. F02M 35/1255 123/184.57 |
| 6,758,304 | B1 | | 7/2004 | McLean |
| 7,487,755 | B2 | | 2/2009 | Harada |
| 2006/0107912 | A1 | | 5/2006 | Hoche et al. |
| 2007/0079784 | A1 | * | 4/2007 | Sasaki ............. F02M 35/10019 123/184.53 |
| 2011/0265763 | A1 | | 11/2011 | Kruger et al. |
| 2015/0068482 | A1 | | 3/2015 | Chen |

FOREIGN PATENT DOCUMENTS

| | | |
|---|---|---|
| JP | 60-8457 A | 1/1985 |
| JP | 60-49228 U | 4/1985 |
| JP | 62-124232 U | 8/1987 |
| JP | 63-268917 A | 11/1988 |
| JP | 2-5711 A | 1/1990 |
| JP | H2-99225 U | 8/1990 |
| JP | 3-168325 A | 7/1991 |
| JP | 6-87657 U | 12/1994 |
| JP | 7-91264 A | 4/1995 |
| JP | 7-145731 A | 6/1995 |
| JP | 11-141425 A | 5/1999 |
| JP | 2000-110679 A | 4/2000 |
| JP | 2009-162151 A | 7/2009 |
| JP | 2009-191696 A | 8/2009 |
| JP | 2011-231766 A | 11/2011 |
| JP | 2014-105666 A | 6/2014 |

OTHER PUBLICATIONS

Extended European Search Report dated Nov. 9, 2018 issued to the corresponding EP Application No. 17752840.3.
European Office Action dated Jun. 28, 2019 issued in the corresponding European Application No. 17752840.3.
International Preliminary Report on Patentability and Written Opinion of the International Searching Authority(Forms PCT/IB/338, PCT/IB/373 and PCT/ISA/237), dated Aug. 30, 2018, for International Application No. PCT/JP2017/000566, with an English Translation of the Written Opinion.
International Search Report (Form PCT/ISA/210), dated Apr. 4, 2017, for International Application No. PCT/JP2017/000566, with an English translation.
Office Action dated Nov. 26, 2019 issued in the corresponding Japanese Application No. 2016-025755 with an English Translation.
Office Action dated Nov. 14, 2019, issued in the corresponding European Application No. 17752840.3.
Decision of Dismissal of Amendment issued in corresponding Japanese Application No. 2016-025755 dated Feb. 12, 2020.
Decision of Refusal issued in corresponding Japanese Application No. 2016-025755 dated Feb. 12, 2020.

* cited by examiner

INTERNAL COMBUSTION ENGINE

TECHNICAL FIELD

The present disclosure relates to an internal combustion engine with at least one cylinder.

BACKGROUND ART

An internal combustion engine is used as a power source in various usages. For instance, as a power source for running a power generation plant or the like, a gas engine is known, which is high power and which uses an economically efficient gas such as methane gas.

Meanwhile, when air or air-fuel mixture is supplied to a combustion chamber of each cylinder in an internal combustion engine, an air-supply valve (scavenging port) disposed on the cylinder opens to let the gas through into the cylinder. At this time, the amount of air or air-fuel mixture supplied to the cylinder is determined depending on the differential pressure between the cylinder and an air-supply manifold. At this time, the differential pressure between the cylinder and the air-supply manifold generates a negative pressure wave, which causes air-supply pulsation corresponding to the combustion cycle. Further, due to the air-supply pulsation, the differential pressure between the cylinder and the air-supply manifold changes with time, and thus the amount of air supplied to each cylinder is affected by the differential pressure. In particular, when the differential pressure between the cylinder and the air-supply manifold decreases, the air-supply amount to the cylinder decreases, which may deteriorate the engine efficiency.

Patent Document 1 discloses a technique to suppress such deterioration of the engine efficiency. The document discloses providing an impulse valve in the intake pipe downstream of a throttle valve and controlling the opening valve of the impulse valve in synchronization with the opening degree change of the throttle valve, which makes it possible to obtain a good following performance even in a case where the air-supply amount changes with the operation state change of the engine, and to suppress deterioration of the engine performance.

CITATION LIST

Patent Literature

Patent Document 1: JP2009-191696A

SUMMARY

Problems to be Solved

In Patent Document 1, the following performance with respect to the variation of the operation state is improved to enhance the engine efficiency. Thus, while the technique is suitable for an application where the operation state changes continuously, such as an automobile engine, the effect is limited in an application where the operation is mostly rated operation, such as a power generation engine.

Further, Patent Document 1 does not disclose any fundamental solution to air-supply pulsation, and further improvement is still necessary in terms of deterioration of the engine efficiency due to air-supply pulsation.

At least one embodiment of the present invention was made in view of the above, and an object is to provide an internal combustion engine capable of improving the engine efficiency by suppressing pressure pulsation that occurs when air is supplied.

Solution to the Problems (1) To solve the above problem, an engine control device according to at least one embodiment of the present invention includes: an engine body having at least one cylinder; an air-supply pipe connected to the at least one cylinder via an air-supply manifold; and an adjustment pipe having a predetermined length and extending from the air-supply manifold. The predetermined length is set so that a first pressure wave propagating from the air-supply manifold toward the adjustment pipe and a second pressure wave propagating from the adjustment pipe toward the air-supply manifold have opposite phases from each other, in at least a part of the at least one cylinder.

With the above configuration (1), an adjustment pipe having a predetermined length is disposed in the air-supply manifold connected to the engine body. The length of the adjustment pipe is set such that the first pressure wave and the second pressure wave are opposite in phase in at least one of the cylinders, and thus the first pressure wave and the second pressure wave are offset in the cylinder. Accordingly, the differential pressure between the cylinder and the air-supply manifold is stabilized and increased, and thereby the amount of air that flows into the cylinder increases (the capacity efficiency improves), which makes it possible to achieve a high engine efficiency.

(2) In some embodiments, in the above configuration (1), the predetermined length is set on the basis of an air-supply temperature or an air-fuel mixture composition (specific heat ratio) at the time of a rated output of the engine body.

The propagation velocity of pressure waves in the air-supply manifold depends on the air-supply temperature, and the composition of air-fuel mixture (specific heat ratio). Thus, with the above configuration (2), it is possible to obtain an internal combustion engine capable of achieving a high engine efficiency particularly during rated operation, by setting the length of the adjustment pipe on the basis of the air-supply temperature and the composition of air-fuel mixture (specific heat ratio) at the time of rated operation of the engine body.

(3) In some embodiments, in the above configuration (1) or (2), the adjustment pipe is disposed on a bend portion of the air-supply manifold.

With the above configuration (3), by providing the adjustment pipe at the bend portion of the air-supply manifold, it is possible to guide the pressure waves propagating straight from the air-supply manifold to the adjustment pipe effectively. Accordingly, it is possible to generate the second pressure wave effectively from the first pressure wave, and thereby to enjoy the above described effect even more effectively.

(4) In some embodiments, in the above configuration (1) or (2), the adjustment pipe includes an inlet facing the at least one cylinder.

With the above configuration (4), by providing the inlet of the adjustment pipe so as to face the cylinder, it is possible to guide the pressure waves due to supply air passing through the air-supply manifold effectively to the adjustment pipe. Accordingly, it is possible to generate the second pressure wave effectively from the first pressure wave, and thereby to enjoy the above described effect even more effectively.

(5) In some embodiments, in any one of the above configurations (1) to (4), the engine body is a single-cylinder engine having a single cylinder.

With the above configuration (5), by providing the adjustment pipe in the air-supply manifold of a single-cylinder engine, pressure pulsation in the supply air is suppressed, and the differential pressure between the air-supply manifold and the cylinder is stabilized when air is supplied to the cylinder. Accordingly, it is possible to obtain a single-cylinder engine with a high engine efficiency.

(6) In some embodiments, in any one of the above configurations (1) to (4), the engine body is a multi-cylinder engine having a plurality of cylinders.

With the above configuration (6), by providing the adjustment pipe in the air-supply manifold of a multi-cylinder engine, pressure pulsation in the supply air is suppressed, and the differential pressure between the air-supply manifold and the cylinder is stabilized when air is supplied to the cylinder, and it is possible to equalize the air-supply amount between the cylinders. Accordingly, it is possible to obtain a multi-cylinder engine with a high engine efficiency.

(7) In some embodiments, in the above configuration (6), the at least one cylinder includes a first cylinder group and a second cylinder group. The air-supply manifold includes a first manifold connected to the first cylinder group and a second manifold connected to the second cylinder group. The adjustment pipe is provided to bring the first manifold and the second manifold into communication with each other.

With the above configuration (7), the adjustment pipe is disposed so as to bring into communication the first manifold and the second manifold for supplying air to the first cylinder group and the second cylinder group forming the plurality of cylinders. Accordingly, it is possible to dissipate pressure waves generated in each cylinder group over a wider range, thereby attenuating the pressure waves, and to suppress pressure pulsation in the air-supply manifolds as described above with the adjustment pipe, thereby obtaining an engine with a high efficiency. Furthermore, such an adjustment pipe can be realized with a compact configuration compared to a case in which the adjustment pipe is provided independently for each cylinder group, and thus it is possible to contribute to reducing the installation space of the engine.

(8) In some embodiments, in any one of the above configurations (1) to (7), the adjustment pipe includes an airflow resistor for generating airflow resistance against supply air which flows through the adjustment pipe.

With the above configuration (8), the airflow resistor disposed in the adjustment pipe slows down the propagation velocity of the pressure waves passing through the adjustment pipe. Accordingly, the pressure waves take more time to pass through the adjustment pipe, and thus it is possible to reduce the length of the adjustment pipe required to offset the first pressure wave and the second pressure wave at the position of the cylinder. Accordingly, it is possible to provide an engine having a more compact configuration and a higher efficiency.

(9) In some embodiments, in the above configuration (8), the airflow resistor comprises a porous material.

With the above configuration (9), by using the airflow resistor formed of a porous material, it is possible to reduce the propagation velocity of the pressure waves passing through the adjustment pipe effectively.

(10) In some embodiments, in the above configuration (9), the airflow resistor is configured to have a variable airflow resistance, and the internal combustion engine includes: a parameter acquisition part configured to obtain a parameter related to an operation state of the engine body; and a control part configured to control airflow resistance of the airflow resistor variably, on the basis of the parameter obtained by the parameter acquisition part.

With the above configuration (10), by variably controlling airflow resistance in accordance with the operation state of the engine body, it is possible to suppress pressure pulsation suitable for the operation state at the moment even in a case where the operation state of the engine changes, and it is possible to obtain an engine with an even higher efficiency.

Advantageous Effects

According to at least one embodiment of the present invention, it is possible to provide an internal combustion engine capable of improving the engine efficiency by suppressing pressure pulsation that occurs when air is supplied.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

First Embodiment

Figure 1:
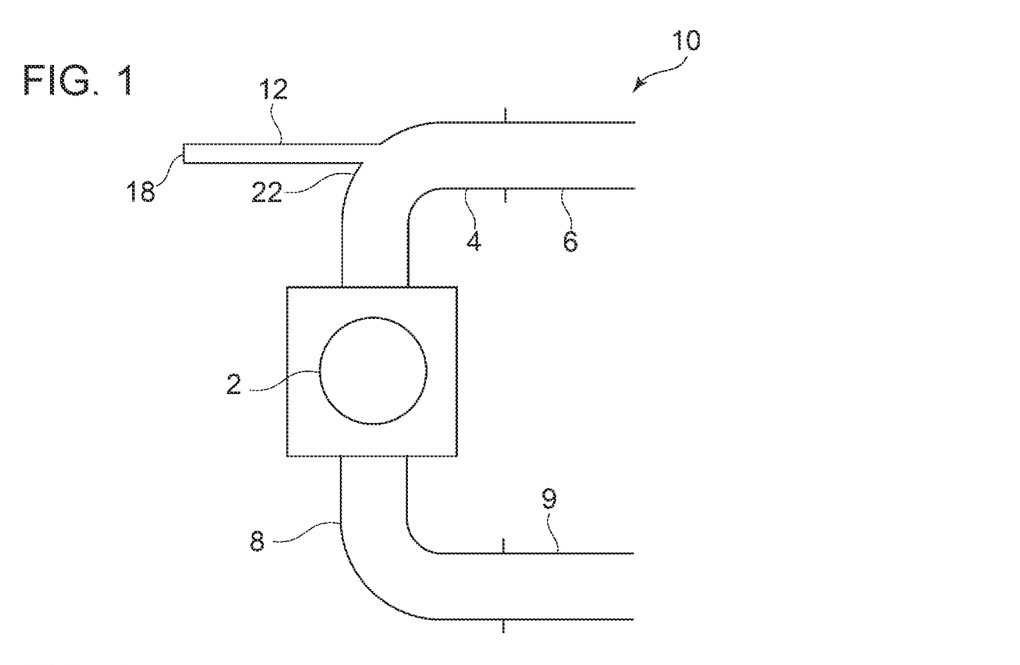
FIG. 1 is a schematic diagram of an overall configuration of an internal combustion engine according to the first embodiment.

FIG. 1 is a schematic diagram of an overall configuration of an internal combustion engine (hereinafter, referred to as "engine" where appropriate) 10 according to the first embodiment.

The engine 10 is a single-cylinder gas engine with a single cylinder 2. An air-supply manifold 4 is connected to a combustion chamber (not shown) of the cylinder 2. An air-supply pipe 6 is connected to the upstream side of the air-supply manifold 4. A mixing device (not shown) for mixing air from an air cleaner and fuel gas to be mixed in midway is disposed in the air-supply pipe 6. Air-fuel mixture produced by the mixing device is introduced into the air-supply manifold 4.

The combustion chamber is charged with the air-fuel mixture introduced into the air-supply manifold 4, as the air-fuel mixture flows into the cylinder 2 according to the differential pressure between the cylinder 2 and the air-supply manifold 4 when the air-supply valve opens. Exhaust gas produced by combustion of air-fuel mixture in the combustion chamber is discharged outside via an exhaust manifold 8 through an exhaust pipe 9.

In the exhaust pipe 9, an exhaust-gas purification device (not shown) including an oxidation catalyst and a denitration catalyst is disposed. Exhaust gas is deprived of harmful substances by the exhaust-gas purification device, and then released to the atmosphere.

Meanwhile, when air-fuel mixture flows into the cylinder 2, a pressure wave is generated in the supply air in the air-supply manifold 4, due to the negative pressure caused by the differential pressure between the cylinder 2 and the air-supply manifold 4. Such a pressure wave is generated corresponding to the combustion cycle of the cylinder 2, and thus causes pressure pulsation in the supply air. Such pressure pulsation may cause temporal change in the differential pressure between the cylinder 2 and the air-supply manifold 4. Thus, when the differential pressure between the cylinder 2 and the air-supply manifold 4 decreases, the air-supply amount to the cylinder 2 decreases, which may deteriorate the engine efficiency.

In the present embodiment, to suppress such deterioration of the efficiency of the engine 10 due to pressure pulsation of supply air, the adjustment pipe 12 is disposed in the air-supply manifold 4. The adjustment pipe 12 has a shape (e.g. length and volume) suitable to attenuate pressure waves generated in the air-supply manifold 4. In the present embodiment, as an example of the adjustment pipe 12, a pipe-shaped member is provided, which has a cylindrical shape of a predetermined diameter and a predetermined length.

The adjustment pipe 12 may be formed integrally with the air-supply manifold 4, or separately from the air-supply manifold 4.

Figure 2:
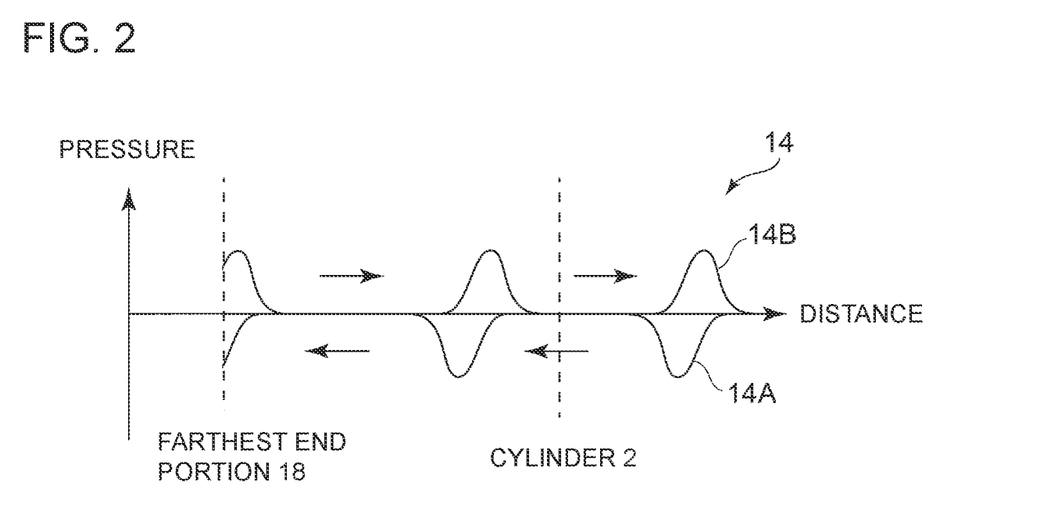
FIG. 2 is a schematic diagram showing how a single pressure wave propagates through an air-supply manifold 4 including an adjustment pipe 12.

FIG. 2 is a schematic diagram showing how a single pressure wave propagates through an air-supply manifold 4 including an adjustment pipe 12.

A pressure wave 14 is generated accompanying opening and closing of an intake valve, enters the adjustment pipe 12 from the side of the air-supply manifold 4, and then propagates toward a farthest end portion 18. The pressure wave 14 having arrived at the farthest end portion 18 is reflected by the inner wall of the adjustment pipe 12, and then propagates from the farthest end portion 18 toward the air-supply manifold 4. Herein, the reflection of the pressure wave 14 at the farthest end portion 18 is reflection at a fixed end, and thus the phase of the pressure wave 14 is reversed upon reflection.

In the following description, of the pressure wave 14 propagating along the above described path, the first pressure wave 14A refers to a pressure wave propagating from the side of the air-supply manifold 4 toward the farthest end portion 18 of the adjustment pipe 12, and the second pressure wave 14B refers to a pressure wave propagating from the farthest end portion 18 of the adjustment pipe 12 toward the air-supply manifold 4.

Figure 3:
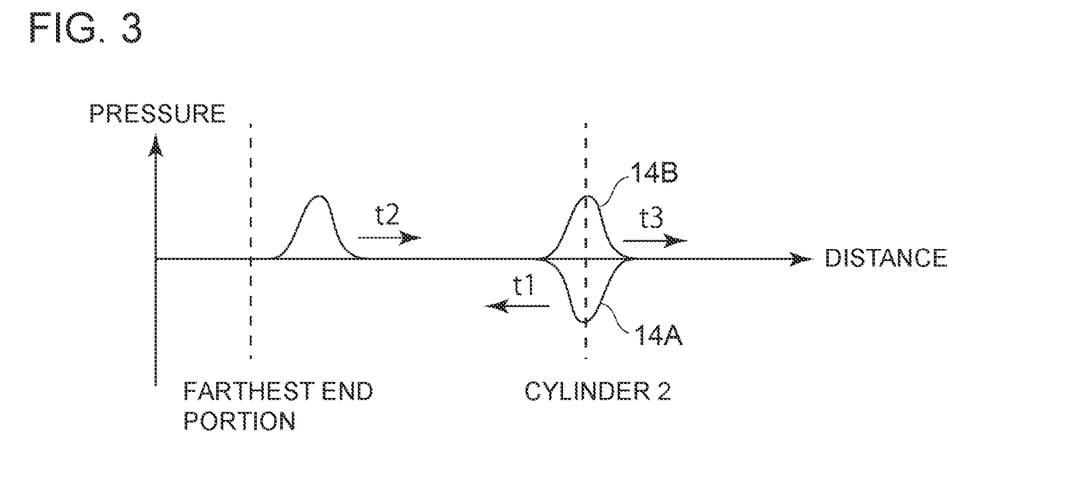
FIG. 3 is a schematic diagram showing how a plurality of pressure waves propagate through an air-supply manifold 4 including an adjustment pipe 12 at a moment.

FIG. 3 is a schematic diagram showing how a plurality of pressure waves propagate through an air-supply manifold 4 including an adjustment pipe 12 at a moment.

The drawing shows a plurality of pressure waves 14 that occur each time the air-supply valve opens and closes, while the combustion cycle is repeated in the engine 10 (time t1, t2, and t3 indicate the occurrence timings of respective pressure waves 14). As shown in FIG. 3, with the adjustment pipe 12 disposed in the air-supply manifold 4, the first pressure wave 14A and the second pressure wave 14B have opposite phases from each other at the installation position of the cylinder 2, and thereby offset each other. Thus, the effect of pressure pulsation of supply air is suppressed at the installation position of the cylinder 2, and the differential pressure between the cylinder 2 and the air-supply manifold 4 is stabilized. As a result, the supply-air amount to the cylinder 2 is also stabilized, and it is possible to suppress deterioration of the engine efficiency.

A method of designing the adjustment pipe 12 suitable to suppress such pressure pulsation will be described in detail. In the example described below, the design is focused on the length, from among the different specifications of the adjustment pipe 12. Nevertheless, another spec parameter, such as capacity, may be designed on the basis of a similar technical idea.

First, the propagation velocity 'v' of the pressure wave 14 in supply air that exists in the air-supply manifold 4 is represented by the following expression (1):

$$v=\sqrt{\gamma RT} \quad (1)$$

where $\gamma$ is a specific ratio, R is a gas constant, and T is the air-supply temperature of supply air.

Further, assuming that Le is the length of the adjustment pipe 12, the following expression (2) represents the time T1 required for the pressure wave to arrive at the cylinder 2 again after entering into the adjustment pipe 12 from the vicinity of the air-supply valve of the cylinder 2 and being reflected by the farthest end portion 18.

$$T_1=(2L_e)/v \quad (2)$$

Herein, the first pressure wave 14A and the second pressure wave 14B are opposite in phase at the position of the cylinder 2, as shown in FIG. 3, if the following expression (3) is satisfied:

$$t=nT_1 \quad (3)$$

where 't' is the open-close cycle period of the air-supply valve in the cylinder 2 and 'n' is a natural number. That is, the length Le of the adjustment pipe 12 is determined on the basis of the expression (2) that satisfies conditions of the expression (3).

Further, in FIG. 3, at the position of the cylinder 2, the first pressure wave 14A and the second pressure wave 14B having opposite phases are completely overlapped and thereby offset completely. Nevertheless, also in a case where the pressure waves are overlapped at least partially, a similar effect can be achieved to some extent. Preferably, the effect can be effectively achieved if the first pressure wave 14A and the second pressure wave 14B are overlapped with each other by approximately 25%.

Further, the propagation velocity 'v' of the first pressure wave 14A and the second pressure wave 14B depends on the air-supply temperature T, and thus the specifications of the adjustment pipe 12 may be determined on the basis of the air-supply temperature T. As shown in the expression (1) in the above example, the propagation velocity 'v' of the pressure waves includes the air-supply temperature T. Particularly in the present embodiment, the engine 10 is a power generation engine, and is assumed to perform mainly rated operation. Accordingly, by setting the length Le on the basis of the assumed air-supply temperature in rated operation, it is possible to achieve a good efficiency when the engine is actually in operation.

Further, in the present embodiment, the air-supply manifold 4 has a bend portion 22 having a predetermined curvature, and is designed such that the inlet of the adjustment pipe 12 is positioned at the bend portion 29. Accordingly, by guiding the pressure wave caused by supply air that passes through the bend portion 22 while swirling to the adjustment pipe 12 effectively, it is possible to produce the second pressure wave effectively by reflection of the first pressure wave 14A.

Figure 4:
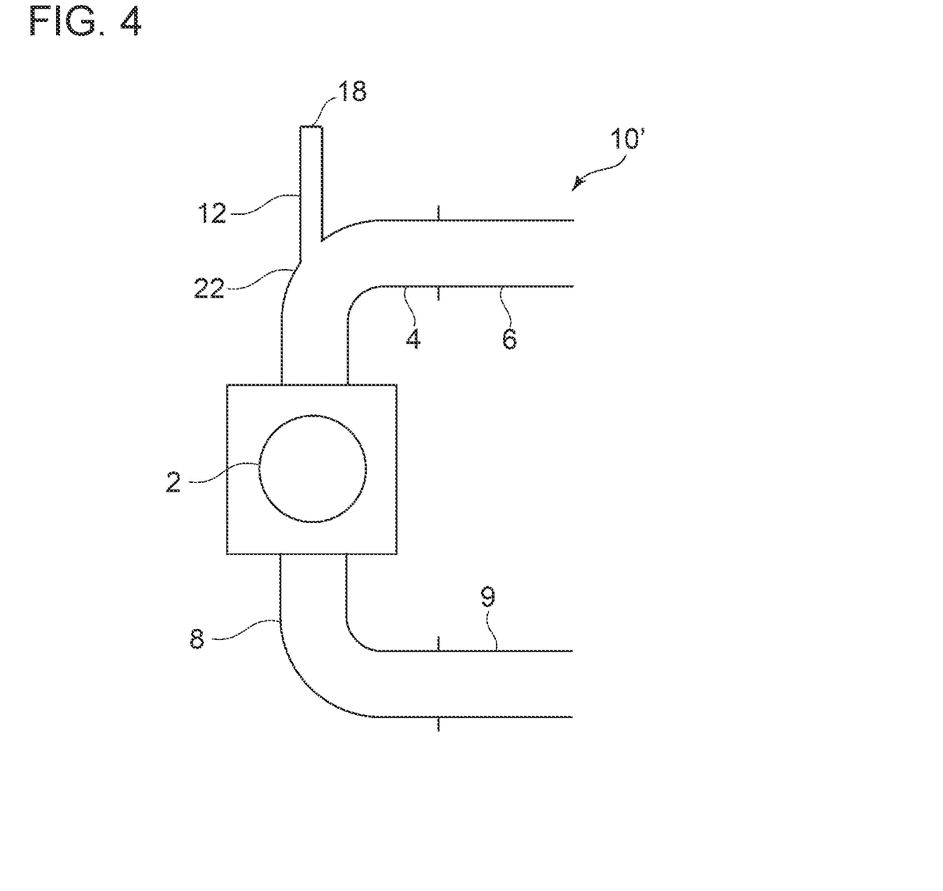
FIG. 4 is a schematic diagram of a modified example of an internal combustion engine according to the first embodiment.

Further, as shown in FIG. 4, the inlet of the adjustment pipe 12 may be disposed so as to face the cylinder 2. By providing the adjustment pipe 12 as described above, it is possible to guide the pressure waves generated when air is supplied to the cylinder 2 effectively to the adjustment pipe 12.

As described above, according to the present embodiment, the single-cylinder engine is provided with an adjustment pipe whose length is set so that the first pressure wave and the second pressure wave have opposite phases from each other, and thereby it is possible to suppress pressure pulsation that occurs when air is supplied. Accordingly, a suitable differential pressure is ensured between the air-supply manifold and the cylinder when air is supplied to the cylinder, and air supply is stabilized, which makes it possible to obtain a high engine efficiency.

Second Embodiment

Figure 5:
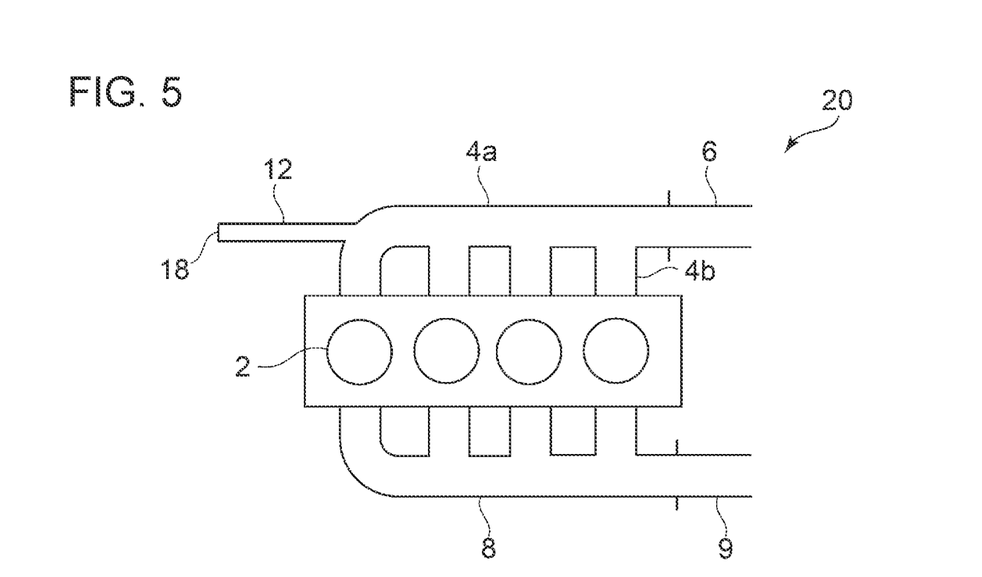
FIG. 5 is a schematic diagram of an overall configuration of an internal combustion engine according to the second embodiment.

FIG. 5 is a schematic diagram of an overall configuration of an engine 20 according to the second embodiment. It should be noted that, the constituent elements corresponding to those in the above described embodiment are associated with the same reference numerals, and not described again unless otherwise required.

The engine 20 is a multi-cylinder gas engine with a plurality of cylinders 2. In the present embodiment, described as an example is an inline-four engine. An air-supply manifold 4 is connected to a combustion chamber (not shown) of the cylinder 2. An air-supply pipe 6 is connected to the upstream side of the air-supply manifold 4.

A mixing device (not shown) for mixing air from an air cleaner and fuel gas to be mixed in midway is disposed in the air-supply pipe 6. Air-fuel mixture produced by the mixing device is introduced into the air-supply manifold 4.

The combustion chamber is charged with the air-fuel mixture introduced into the air-supply manifold 4, as the air-fuel mixture flows into each cylinder 2 according to the differential pressure between the cylinder 2 and the air-supply manifold 4 when the air-supply valve opens. Exhaust gas produced by combustion of air-fuel mixture in the combustion chamber of each cylinder 2 is collected by the exhaust manifold 8, and is discharged outside through the exhaust pipe 9.

In the exhaust pipe 9, an exhaust-gas purification device (not shown) including an oxidation catalyst and a denitration catalyst is disposed. Exhaust gas is deprived of harmful substances by the exhaust-gas purification device, and then released to the atmosphere.

Also in a multi-cylinder engine such as the engine 20 according to the present embodiment, similarly to the above described single-cylinder engine, when air-fuel mixture flows into the cylinder 2, a pressure wave is generated in the supply air in the air-supply manifold 4, due to the negative pressure caused by the differential pressure between the cylinder 2 and the air-supply manifold 4. Such a pressure wave is generated corresponding to the combustion cycle of the cylinder 2, and thus causes pressure pulsation in the supply air. Such pressure pulsation may cause temporal change in the differential pressure between the cylinder 2 and the air-supply manifold 4. Thus, when the differential pressure between the cylinder 2 and the air-supply manifold 4 decreases, the air-supply amount to the cylinder 2 decreases, which may deteriorate the engine efficiency.

Furthermore, in a multi-cylinder engine, pressure waves generated in the respective cylinders 2 interfere with one another, and thereby the air supply amount may vary among the cylinders 2. Such variation of the air-supply amount among the cylinders 2 may also cause deterioration of the engine efficiency.

In the present embodiment, to suppress such deterioration of the efficiency of the engine 20, the adjustment pipe 12 is disposed in the air-supply manifold 4. The adjustment pipe 12 has a shape (e.g. length and volume) suitable to attenuate pressure waves that occur in the air-supply manifold 4. The specifications of the adjustment pipe 12 can be determined on the basis of an idea similar to that of the first embodiment. However, in a case of a multi-cylinder engine, it is necessary to take into account the interference between the pressure waves of the respective cylinders, and thus the conditions are more complicated than in the case of a single-cylinder engine. Thus, suitable specifications may be determined taking into account a result obtained by a method using experiments or simulations, in addition to the theoretical calculation values described above.

Figure 6:
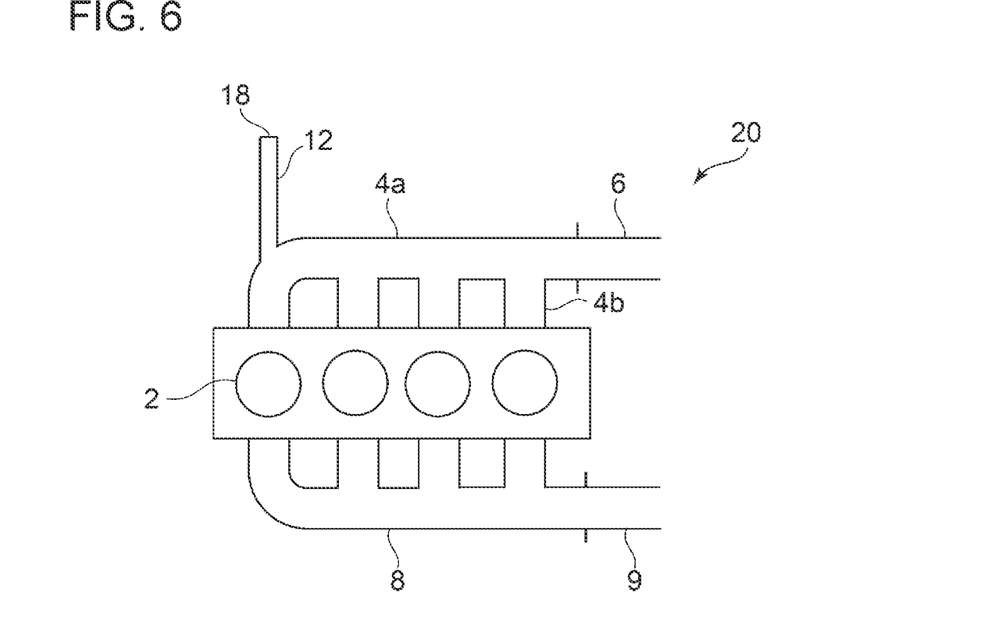
FIG. 6 is a schematic diagram of a modified example of an internal combustion engine according to the second embodiment.

In the present embodiment, the air-supply manifold 4 includes a main flow passage 4a extending along the arrangement direction of each cylinder 2, and a plurality of branch passages 4b that branch into respective cylinders 2 from the main flow passage 4a. In the present example, similarly to the first embodiment, the bend portion 22 having a predetermined curvature is designed such that the inlet of the adjustment pipe 12 faces the air-supply pipe 6. Nevertheless, the inlet of the adjustment pipe 12 may be disposed so as to face the cylinder 2, as shown in FIG. 6.

In the present embodiment, similarly to the first embodiment, the first pressure wave 14A and the second pressure wave 14B are opposite in phase at the position of a particular cylinder. Nevertheless, the pressure waves may be opposite in phase at positions of two or more cylinders 2, or may be opposite in phase simultaneously at positions of all of the cylinders.

Figure 7:
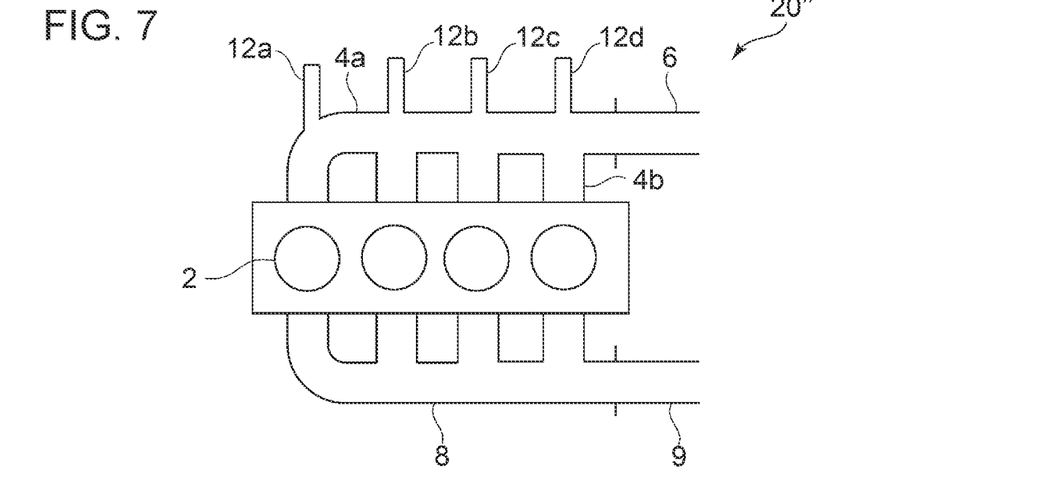
FIG. 7 is a schematic diagram of a modified example of an internal combustion engine according to the second embodiment.

Further, as shown in FIG. 7, a plurality of adjustment pipes 12 may be provided corresponding to the respective cylinders 2. In FIG. 7, each adjustment pipe 12 is disposed so as to face corresponding one of the cylinders 2. In this case, by adjusting the specifications of each adjustment pipe 12, it is possible to suppress pressure pulsation of each cylinder 12 with a high accuracy, and to improve the engine efficiency more effectively.

As described above, according to the present embodiment, also in a multi-cylinder engine having a plurality of cylinders, the engine is provided with an adjustment pipe 12 whose length is set so that the first pressure wave 14A and the second pressure wave 14B have opposite phases from each other, and thereby it is possible to suppress pressure pulsation. As a result, the air-supply amount is equalized for the plurality of cylinders 2, and thereby variation of the air-supply amount among the cylinders is suppressed, which makes it possible to obtain a high engine efficiency.

Third Embodiment

Figure 8:
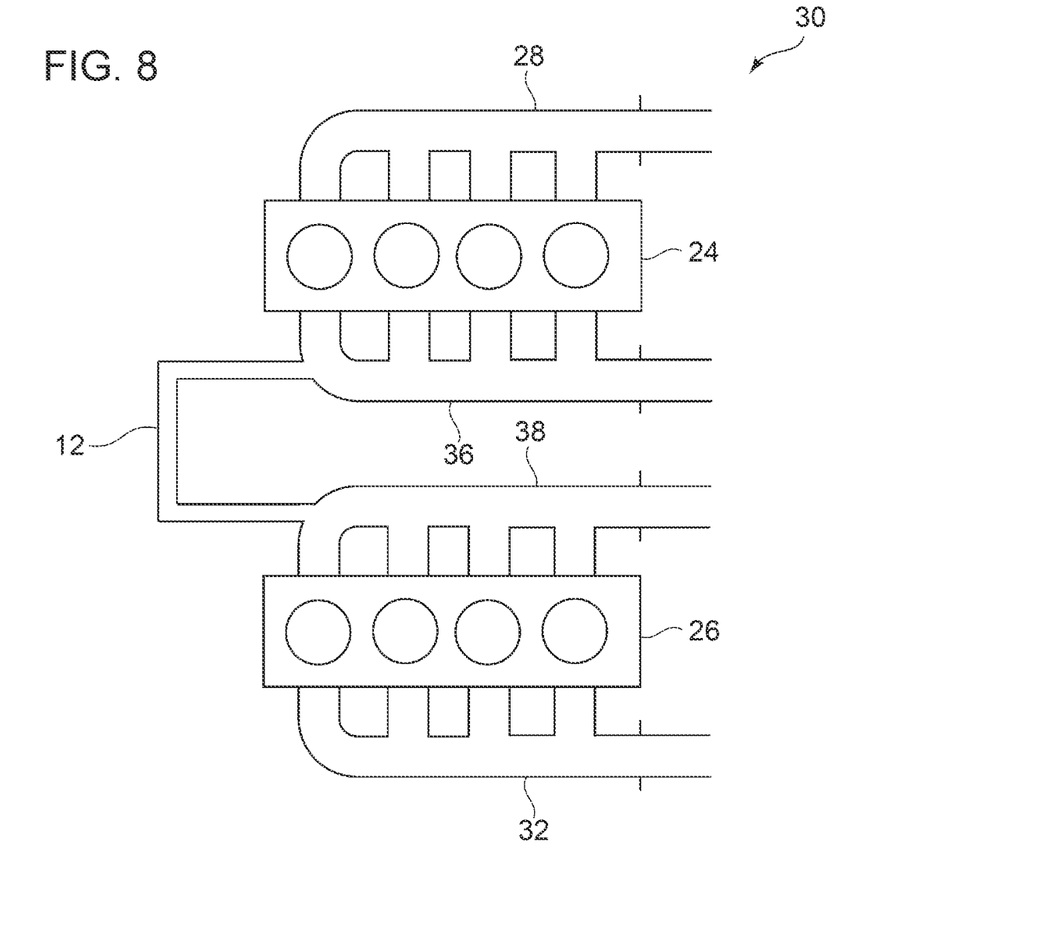
FIG. 8 is a schematic diagram of an overall configuration of an internal combustion engine according to the third embodiment.

FIG. 8 is a schematic diagram of an overall configuration of an engine 30 according to the third embodiment. It should be noted that, the constituent elements corresponding to those in the above described embodiment are associated with the same reference numerals, and not described again unless otherwise required.

The engine 30 is a V-type 8-cylinder gas engine for power generation, which is oblique and forming a V shape toward the right and the left across the rotational axis of a crank shaft (not shown). The eight cylinders 2 in total are divided into an RH bank 24, which is the first cylinder group, and a LH bank 26, which is the second cylinder group, each of which is arranged in a V shape. In the V-shaped spaces of the RH bank 24 and the LH bank, a first air-supply manifold 28 and a second air-supply manifold 32 are coupled, respectively, for introducing air-fuel mixture into the combustion chamber of each cylinder of each bank. The first air-supply manifold 28 and the second air-supply manifold 32 are configured to be in communication with each other via the adjustment pipe 12.

On the outer side of the RH bank 24, a first exhaust manifold 36 for introducing exhaust gas discharged from the combustion chamber of each cylinder 2 is provided. On the outer side of the LH bank 26, a second exhaust manifold 38 for introducing exhaust gas discharged from the combustion chamber of each cylinder 2 is provided.

Although not depicted in FIG. 8, the first exhaust manifold 36 and the second exhaust manifold 38 are merged at the downstream side, and then exhaust gas is deprived of harmful substances by an exhaust-gas purification device (not shown) including an oxidation catalyst and a denitration catalyst, before being released to the atmosphere.

In the present embodiment, to suppress deterioration of the efficiency of the engine due to pressure pulsation of supply air that occurs in each of the air-supply manifolds 28 and 32, the adjustment pipe 12 is disposed so as to bring the air-supply manifold 28 and the air-supply manifold 32 into communication.

Figure 9:
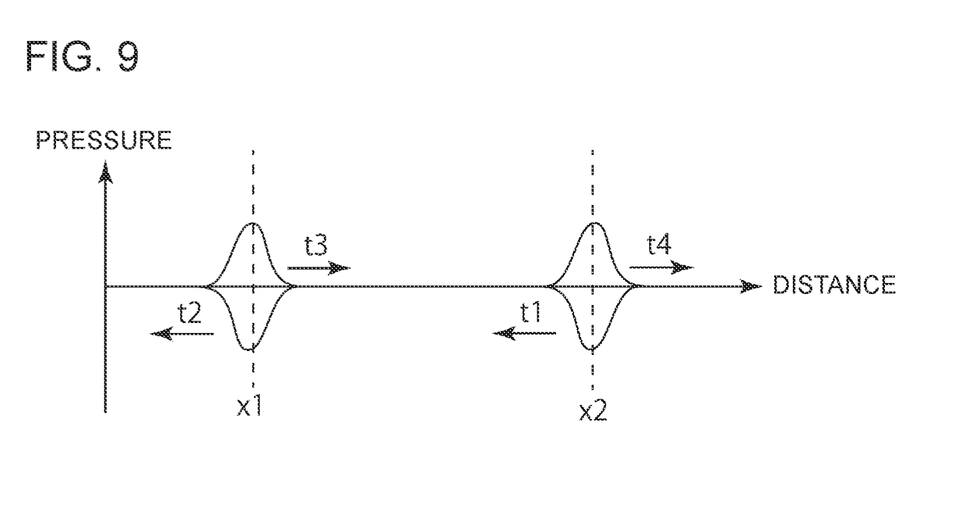
FIG. 9 is a schematic diagram of an overall configuration of an internal combustion engine according to the fourth embodiment.

FIG. 9 is a schematic diagram showing pressure waves which propagate through the adjustment pipe 12 shown in FIG. 9. The first pressure wave 14A generated in the first air-supply manifold 28 propagates toward the second air-supply manifold 32 via the adjustment pipe 12. The second pressure wave 14B generated in the second air-supply manifold 32 propagates toward the first air-supply manifold 28 via the adjustment pipe 12. As shown in FIG. 9, the adjustment pipe 12 is designed so that the first pressure wave 14A and the second pressure wave 14B are opposite in phase in at least one of the cylinders 2 of the RH bank 24 and the LH bank 26 (in FIG. 9, x1 indicates the position of a cylinder 2 included in the RH bank 24, and x2 indicates the position of a cylinder 2 included in the LH bank 26). Accordingly, the pressure waves in supply air are dispersed widely and attenuated in the air-supply manifolds 28 and 32 via the adjustment pipe 12, and offset each other. As a result, pressure pulsation in the air-supply manifolds 28 and 32 is suppressed, which makes it possible to achieve a high engine efficiency.

Further, a single adjustment pipe 12 is provided so as to bring the first air-supply manifold 28 and the second air-supply manifold 32 into communication, and thereby it is possible to suppress pressure pulsation with a compact configuration, compared to a case in which an adjustment pipe 12 having a farthest end portion 18 like the above embodiment is provided for the first air-supply manifold 28 and the second air-supply manifold 32.

As described above, according to the present embodiment, in a case where the multi-cylinder engine includes the RH bank 24 and the LH bank 26, the adjustment pipe 12 is disposed so as to bring the first air-supply manifold 28 and the second air-supply manifold 32 into communication, and thereby the pressure waves are dissipated widely and attenuated, which makes it possible to offset the pressure waves and suppress the pressure pulsation effectively. Furthermore, such an effect can be realized with a compact configuration compared to a case in which the adjustment pipe 12 is provided independently for each cylinder group, and thus it is possible to contribute to reducing the installation space of the engine.

Fourth Embodiment

Figure 10:
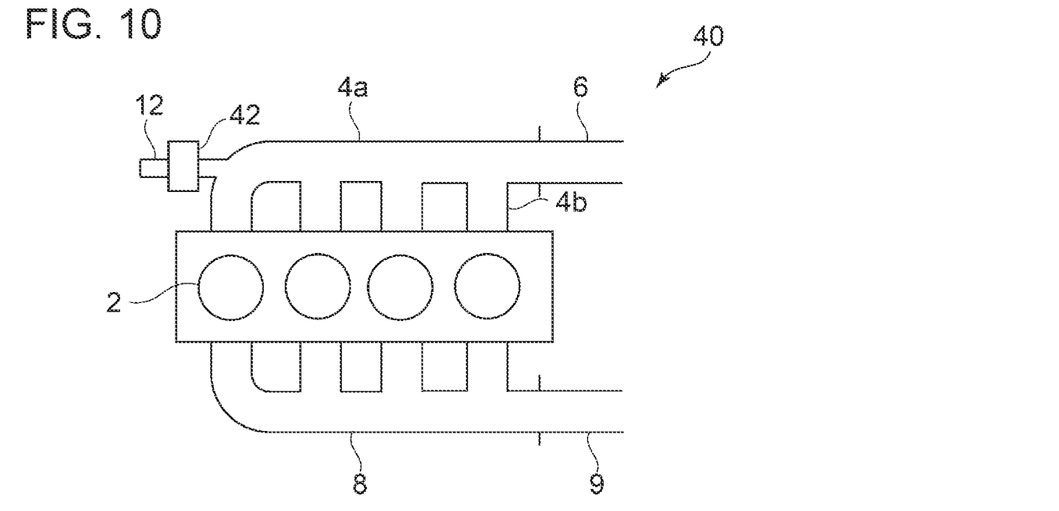
FIG. 10 is a schematic diagram showing pressure waves which propagate through the adjustment pipe shown in FIG. 9.

FIG. 10 is a schematic diagram of an overall configuration of an engine 40 according to the fourth embodiment. It should be noted that, the constituent elements corresponding to those in the above described embodiment are associated with the same reference numerals, and not described again unless otherwise required.

FIG. 10 is a diagram of an engine 40 having the same basic configuration as that in the second embodiment, except for an airflow resistor 42 disposed in the adjustment pipe 12. The airflow resistor 42 is a constituent element that serves as a resistor against the pressure waves propagating through the adjustment pipe 12, and is formed of a porous material such as ceramics and perforated metal.

In the present embodiment, by providing the airflow resistor 42 in the adjustment pipe 12, the propagation velocity of pressure waves passing through the adjustment pipe decreases. Accordingly, the pressure waves take more time to pass through the adjustment pipe 12, and thus it is possible to reduce the length of the adjustment pipe 12 required to offset the first pressure wave 14A and the second pressure wave 14B at the position of the cylinder 2. Accordingly, it is possible to provide an engine having a more compact configuration and a higher efficiency.

While the engine described in the present embodiment has the same basic configuration as that in the second embodiment, it will be understood that a similar effect can be achieved for an engine having the same basic configuration as that in another embodiment by providing the airflow resistor 42 in the adjustment pipe 12.

Fifth Embodiment

Figure 11:
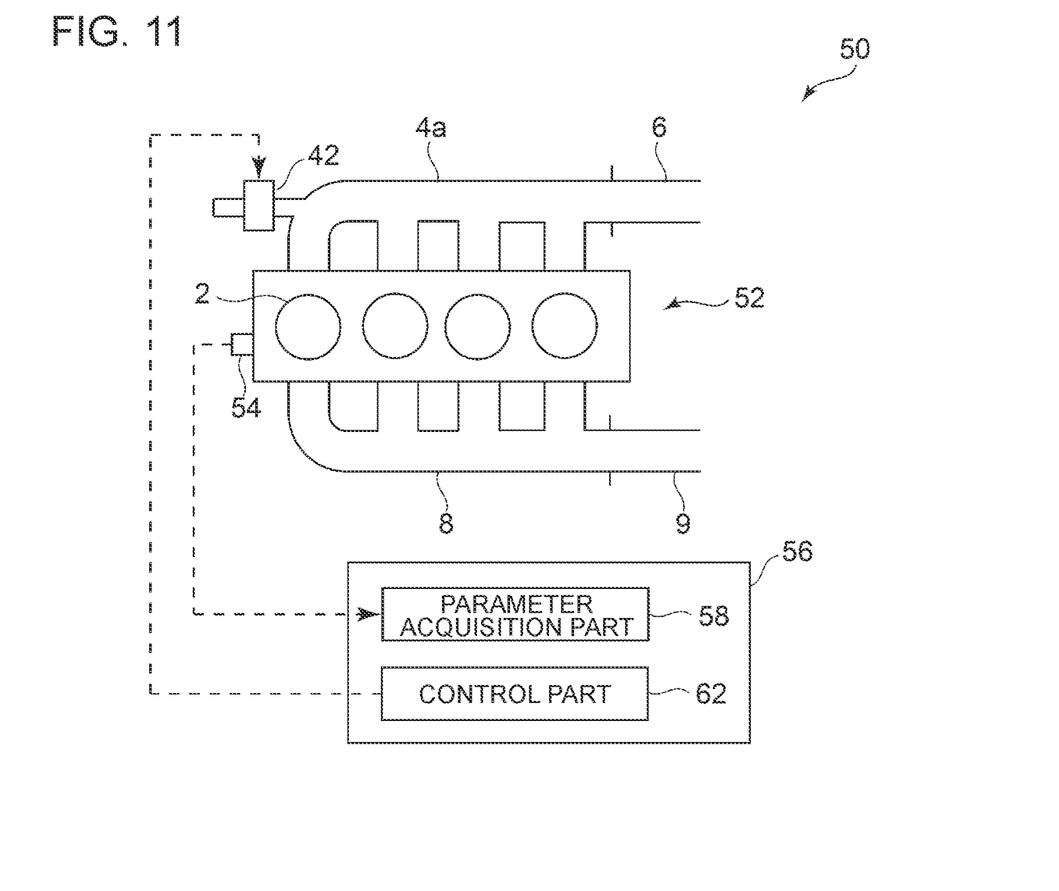
FIG. 11 is a schematic diagram of an overall configuration of an engine system according to the fifth embodiment.

FIG. 11 is a schematic diagram of an overall configuration of an engine system 50 for an engine according to the fifth embodiment. It should be noted that, the constituent elements corresponding to those in the above described embodiment are associated with the same reference numerals, and not described again unless otherwise required.

In the present embodiment, the engine system includes an engine 52 having the same configuration as the above fourth embodiment and including an airflow resistor 42 in an adjustment pipe 12, an operation state detection unit 54 for detecting the operation state of the engine 52, and a controller 56 for controlling the engine 52 electronically on the basis of detection results of the operation state detection unit 54.

The airflow resistor 42 used in the present embodiment is configured to have a variable airflow resistance value. The airflow resistor 42 with a variable airflow resistance value is configured such that the airflow resistance value is variably adjustable by arranging a pair of porous elements having a predetermined airflow resistance value parallel to each other with respect to the propagation direction of the pressure waves, and changing the position of at least one of the porous elements with a driving unit such as a piezoelectric element.

The operation state detection unit 54 is a device which detects a parameter related to the operation state of the engine 52. Particularly in the present embodiment, a rotation-speed sensor for detecting the rotation speed of the engine 52 is presented as an example.

As the operation state detection unit 54, for instance, a device which detects the output of the engine 52, the pressure, temperature, or composition of supply air flowing through the air-supply manifold 4 may be used.

The controller 56 is a control unit including an electronic computation device such as ECU, and includes a parameter acquisition part 58 to obtain a parameter detected by the operation state detection unit 54 and a control part 62 to control the airflow resistance of the airflow resistor variably. The control part 62 is capable of adjusting the length of the adjustment pipe 12 substantially, by adjusting the airflow resistance value of the airflow resistor 42 on the basis of the parameter obtained by the parameter acquisition part 58. Accordingly, it is possible to suppress pressure pulsation in accordance with the operation state of the engine 52. Thus, it is possible to obtain a high engine efficiency even in a case where the operation state of the engine changes, in particular.

INDUSTRIAL APPLICABILITY

The present disclosure is applicable to an internal combustion engine having at least one cylinder.

DESCRIPTION OF REFERENCE NUMERALS

2 Cylinder
4 Air-supply manifold
4a Main flow passage
4b Branch passage
6 Air supply pipe
8 Exhaust manifold
9 Exhaust pipe
12 Adjustment pipe
14 Pressure wave
14A First pressure wave
14B Second pressure wave
18 Farthest end portion
28 First air-supply manifold
32 Second air-supply manifold
36 First exhaust manifold
38 Second exhaust manifold
42 Airflow resistor
50 Engine system
54 Operation state detection unit
56 Controller
58 Parameter acquisition part
62 Control part

The invention claimed is:

1. An internal combustion engine for power generation, comprising:
    an engine body having at least one cylinder;
    an air-supply pipe connected to the at least one cylinder via an air-supply manifold; and
    an adjustment pipe having a predetermined length and extending from the air-supply manifold,
    wherein the predetermined length is set so that a first pressure wave propagating from the air-supply manifold toward the adjustment pipe and a second pressure wave propagating from the adjustment pipe toward the air-supply manifold have opposite phases from each other, in at least a part of the at least one cylinder, and
    wherein the predetermined length is set on the basis of an air-supply temperature or an air-fuel mixture composition at the time of a rated output of the engine body.

2. The internal combustion engine according to claim 1, wherein the adjustment pipe is disposed on a bend portion of the air-supply manifold.

3. The internal combustion engine according to claim 1, wherein the adjustment pipe includes an inlet portion facing the at least one cylinder.

4. The internal combustion engine according to claim 1, wherein the engine body is a single-cylinder engine having a single cylinder.

5. The internal combustion engine according to claim 1, wherein the engine body is a multi-cylinder engine having a plurality of cylinders.

6. The internal combustion engine according to claim 5, wherein the at least one cylinder includes a first cylinder group and a second cylinder group,
    wherein the air-supply manifold includes a first manifold connected to the first cylinder group and a second manifold connected to the second cylinder group, and
    wherein the adjustment pipe is provided to bring the first manifold and the second manifold into communication with each other.

7. The internal combustion engine according to claim 1, wherein the adjustment pipe includes an airflow resistor for generating airflow resistance against supply air which flows through the adjustment pipe.

8. The internal combustion engine according to claim 7, wherein the airflow resistor comprises a porous material.

9. The internal combustion engine according to claim 8, wherein the airflow resistor is configured to have a variable airflow resistance value, and
    wherein the internal combustion engine comprises:
    a parameter acquisition part configured to obtain a parameter related to an operation state of the engine body; and a control part configured to control airflow resistance of the airflow resistor variably, on the basis of the parameter obtained by the parameter acquisition part.

* * * * *